United States Patent [19]
Emmrich et al.

[11] Patent Number: 5,579,871
[45] Date of Patent: Dec. 3, 1996

[54] BRAKE ASSEMBLY FOR ROLLABLE UTILITY CARTS

[75] Inventors: Holger Emmrich, Wiesbaden/Delkenheim, Germany; Thomas A. Jurlina, Brick, N.J.

[73] Assignee: Lermer Corporation, Eatontown, N.J.

[21] Appl. No.: 456,250

[22] Filed: May 31, 1995

[51] Int. Cl.$^6$ ................................................. B60B 33/00
[52] U.S. Cl. ............................ 188/19; 188/1.12; 16/35 R
[58] Field of Search .................... 188/1.12, 19; 16/35 R

[56] References Cited

U.S. PATENT DOCUMENTS

| | | |
|---|---|---|
| Re. 34,433 | 11/1993 | Heiligenthal et al. ............... 188/1.12 |
| 2,474,804 | 6/1949 | Schwarzbaum . |
| 2,684,734 | 7/1954 | Wilson . |
| 2,685,351 | 8/1954 | Kramcsak, Jr. . |
| 2,864,465 | 12/1958 | Welsh et al. . |
| 3,061,049 | 10/1962 | Bramley . |
| 3,313,377 | 4/1967 | Aninger . |
| 3,479,681 | 11/1969 | Maslow . |
| 3,710,895 | 1/1973 | Freedman . |
| 4,152,951 | 5/1979 | Korczykowski . |
| 4,175,783 | 11/1979 | Pioth . |
| 4,248,445 | 2/1981 | Vassar . |
| 4,276,962 | 7/1981 | Aulik . |
| 4,360,951 | 11/1982 | Bucher . |
| 4,526,253 | 7/1985 | Schmidt ................................ 188/1.12 |
| 4,679,662 | 7/1987 | Nordskog . |
| 4,793,445 | 12/1988 | Collignon et al. . |
| 5,242,035 | 9/1993 | Lange . |
| 5,244,062 | 9/1993 | Felton . |

FOREIGN PATENT DOCUMENTS

| | | |
|---|---|---|
| 1198211 | 8/1965 | Germany . |
| 2002978 | 7/1971 | Germany . |
| 2239339 | 3/1973 | Germany . |
| 1753820 | 2/1974 | Germany . |
| 2508950 | 3/1978 | Germany . |
| 2506955 | 12/1978 | Germany . |
| 1308774 | 3/1973 | United Kingdom . |
| 1338643 | 11/1973 | United Kingdom . |

*Primary Examiner*—Matthew C. Graham
*Attorney, Agent, or Firm*—Lerner, David, Littenberg, Krumholz & Mentlik

[57] ABSTRACT

Rollable articles such as utility carts used as aircraft galley carts are provided with a brake assembly for locking and unlocking the wheel assemblies. The brake assembly includes a brake actuator pedal assembly arranged at one or both ends of the cart to enable locking and unlocking of the wheel assemblies by a pair of pedals. A centrally arranged swivel connector assembly is operative in association with the brake pedals to effect the locking and unlocking of the wheel assemblies by a pair of brake actuator linkage assemblies.

35 Claims, 6 Drawing Sheets

BRAKE ASSEMBLY FOR ROLLABLE UTILITY CARTS

BACKGROUND OF THE INVENTION

The present invention relates in general to a brake assembly for rollable articles, and more particularly, to a single acting brake assembly for simultaneously braking a plurality of wheel assemblies.

Floor supported movable articles such as cabinets, utility carts and tables are widely used in industry and business such as in offices, restaurants and factories, as well as on aircraft. These movable articles typically include a plurality of wheel assemblies to facilitate their movement from one location to the next. It is generally known to provide a braking assembly for locking the wheel assemblies to preclude their movement in certain circumstances. However, many of the known braking assemblies do not perform well in certain situations. For example, aircraft galley carts are required to be moved within narrow seat aisles which typically prevent movement of a flight attendant from one end of the galley cart to the other. This restricted access to the ends of the galley cart require a braking assembly capable of being operated by one person from a position on either end of the cart. Due to the nature of aircraft galley carts, the brake assembly should be capable of braking the wheel assembly even when the cart is heavily loaded and when the floor in the aircraft cabin is sloped, for example, during take-off and descent.

To this end, there is known brake assemblies which are activated by means of a foot pedal which enables the operative engagement of the brake assembly with the wheel assemblies.

For example, brake assemblies for aircraft galley carts are known from Felton, U.S. Pat. No. 5,244,062, Collignon, et al., U.S. Pat. No. 4,793,445, Nordskog, U.S. Pat. No. 4,679,662, and Schmidt, U.S. Pat. No. 4,526,253. In Felton, a brake assembly is arranged at both ends of the galley cart which is operative in only one direction irrespective of whether a braking or a releasing operation is to be performed. This is accomplished by a brake pedal being connected to a cam follower through a swivel bar. The cam follower is positioned within a cam track which is operative for locking and unlocking the wheel assembly.

In Collignon, et al., there is provided a single acting brake assembly which simultaneously brakes two wheel assemblies of a utility cart. The brake assembly includes a bracket mounted between the wheel assemblies to be braked. A longitudinal frame assembly, having wheel engaging brake shoes, extends between the wheel assemblies and is slidably mounted to the bracket for vertical movement with respect thereto. A cam member is pivotably mounted between the bracket and the frame assembly. Pivoting the cam member effectively moves the frame assembly relative to the bracket, which engages brake shoes against the wheels within the wheel assemblies.

In Nordskog, an aircraft galley cart is provided with a braking plate having a notched outer periphery which is secured to one side of a wheel assembly. A braking assembly includes a rubber ball operatively coupled to a brake pedal which is engagable within one of the notches for locking the wheel assembly in a non-rotatable condition.

In Schmidt, a pair of rotatable eccentric cams are mounted on the bottom of an aircraft galley cart at either end thereof. The cams cause transverse movement of an associated brake rod having its ends located to actuate a spring loaded brake pin into a locked position with respect to the wheel assemblies. The cam is operatively rotated by separate locking and unlocking brake pedals arranged in pairs at both ends of the galley cart.

In order to meet the rigid demands of these galley carts, brake assemblies are required which are sturdy, while at the same time ensure positive locking of the wheel assemblies. The inadvertent rolling of a galley cart when in use, or during take-off or descent of an aircraft, can cause serious injury to passengers, flight attendants, as well as to the aircraft itself. At the same time, it has been found that these known brake assemblies considerably increase the weight of the galley cart, and in certain cases, are constructed in a manner which exceeds their mechanical requirements. In this regard, conventional aircraft galley carts are known to be relatively heavy and cumbersome, including heavy duty wheel assemblies, brackets and the like such as known from Schmidt. The extra weight and cumbersomeness of these brake assemblies significantly make these galley carts more difficult to move and manipulate within narrow seat aisles, as well as more expensive to manufacture and repair.

There is therefore an unsolved need for a brake assembly for rollable articles such as utility carts, in particular aircraft galley carts, which remedy the above-mentioned drawbacks and which provide a brake assembly which is easy to operate, which requires little maintenance and adjustment, and which permits safe braking even during turbulent conditions of the aircraft.

SUMMARY OF THE INVENTION

One object of the present invention is to provide a brake assembly for rollable articles which can easily be operated from either end thereof.

Another object of the present invention is to provide a brake assembly for rollable articles which is compact and easily adaptable to existing utility carts such as aircraft galley carts and the like.

Another object of the present invention is to provide a brake assembly for rollable articles which will brake a plurality of wheel assemblies simultaneously.

Another object of the present invention is to provide a brake assembly for rollable articles which is operative using lightweight components of inexpensive design, while at the same time, enabling braking of heavily constructed utility carts such as aircraft galley carts and the like.

Another object of the present invention is to provide a brake assembly for an aircraft galley cart which allows the cart to be easily manipulated through seat aisles and the like, while facilitating the locking and unlocking of the wheel assemblies.

Another object of the present invention is to provide an aircraft galley cart which meets all the requirements of such a galley cart and which remedies the above-mentioned drawbacks of the known galley carts.

In accordance with one embodiment of the present invention there is disclosed a brake assembly for a rollable article, the article including a base, a plurality of wheels attached to the base and at least one wheel locking assembly arrangeable in a first condition for locking at least one of the wheels to prevent rolling movement of the article and a second condition for unlocking at least one of the wheels to permit rolling movement of the article, the brake assembly comprising at least one brake actuator pedal assembly attached to one end of the base, a brake actuator linkage having a ramped portion at one end thereof, and operating means in operative association with the brake actuator pedal assembly for causing the ramped portion to alter the condition of the wheel locking assembly between the first and second conditions.

In accordance with another embodiment of the present invention there is disclosed a brake assembly for a rollable article, the article including a base, a plurality of wheels attached to the base and at least one wheel locking assembly arrangeable in a first condition for locking at least one of the wheels to prevent rolling movement of the article and a second condition for unlocking at least one of the wheels to permit rolling movement of the article, the brake assembly comprising at least one brake actuator pedal assembly attached to one end of the base, a brake actuator linkage having a ramped portion arranged in operative association with the at least one wheel locking assembly, a brake linkage in operative association with the brake actuator pedal assembly, and a swivel connector assembly operatively connecting the brake linkage to the brake actuator linkage assembly, whereby operation of the brake actuator pedal assembly causes rotation of the swivel connector assembly by means of the brake linkage such that the ramped portion is operative for arranging the at least one wheel locking assembly in one of the first and second conditions.

In accordance with another embodiment of the present invention there is disclosed a rollable cart comprising a base having a front end and a rear end and a top surface and a bottom surface; a plurality of wheels mounted on the bottom surface of the base at the front and rear ends; a plurality of wheel locking assemblies arranged in operative association with the plurality of wheels for placing the plurality of wheels into locked and unlocked conditions, the wheel locking assemblies each including wheel restraining means arranged between the bottom surface of the base and the plurality of wheels for directly engaging and disengaging the plurality of wheels upon actuation thereof; and a brake assembly arranged on the bottom surface of the base for operation of each of the wheel locking assemblies, the brake assembly comprises a plurality of elongated brake actuator linkages extending longitudinally between the plurality of wheels between the front and rear ends of the base, each of the elongated brake actuator linkages having a first ramped portion and a second ramped portion arranged for engagement with respective ones of the wheel locking assemblies, and brake actuator means for actuating the plurality of elongated brake actuator linkages into engagement and disengagement with the plurality of wheel locking assemblies whereby the first and second ramped portions place the plurality of wheel locking assemblies in a locking condition wherein the wheel restraining means are urged into direct engagement with the plurality of wheels and an unlocking condition wherein the wheel restraining means return to their disengaged position with respect to the plurality of wheels.

BRIEF DESCRIPTION OF THE DRAWINGS

The above description, as well as further objects, features and advantages of the present invention will be more fully understood with reference to the following detailed description of a brake assembly for rollable articles such as utility carts, and more particularly to aircraft galley carts and the like, when taken in conjunction with the accompanying drawings, wherein.

DETAILED DESCRIPTION OF THE PREFERRED EMBODIMENTS

Figure 1:
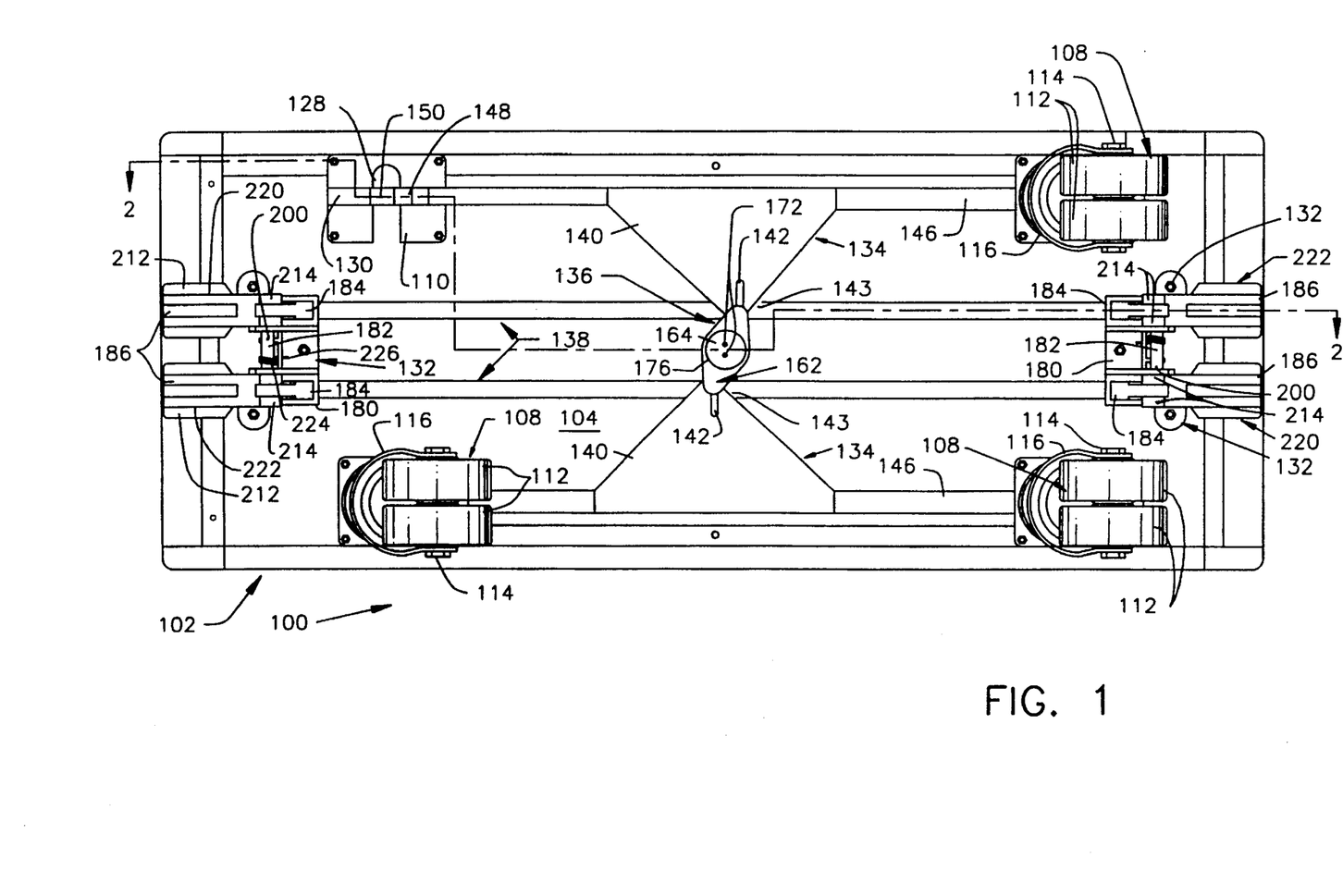
FIG. 1 is a top plan view of a brake assembly for a utility cart, in particular an aircraft galley cart, constructed in accordance with one embodiment of the present invention.
Figures 2, 3, 4:
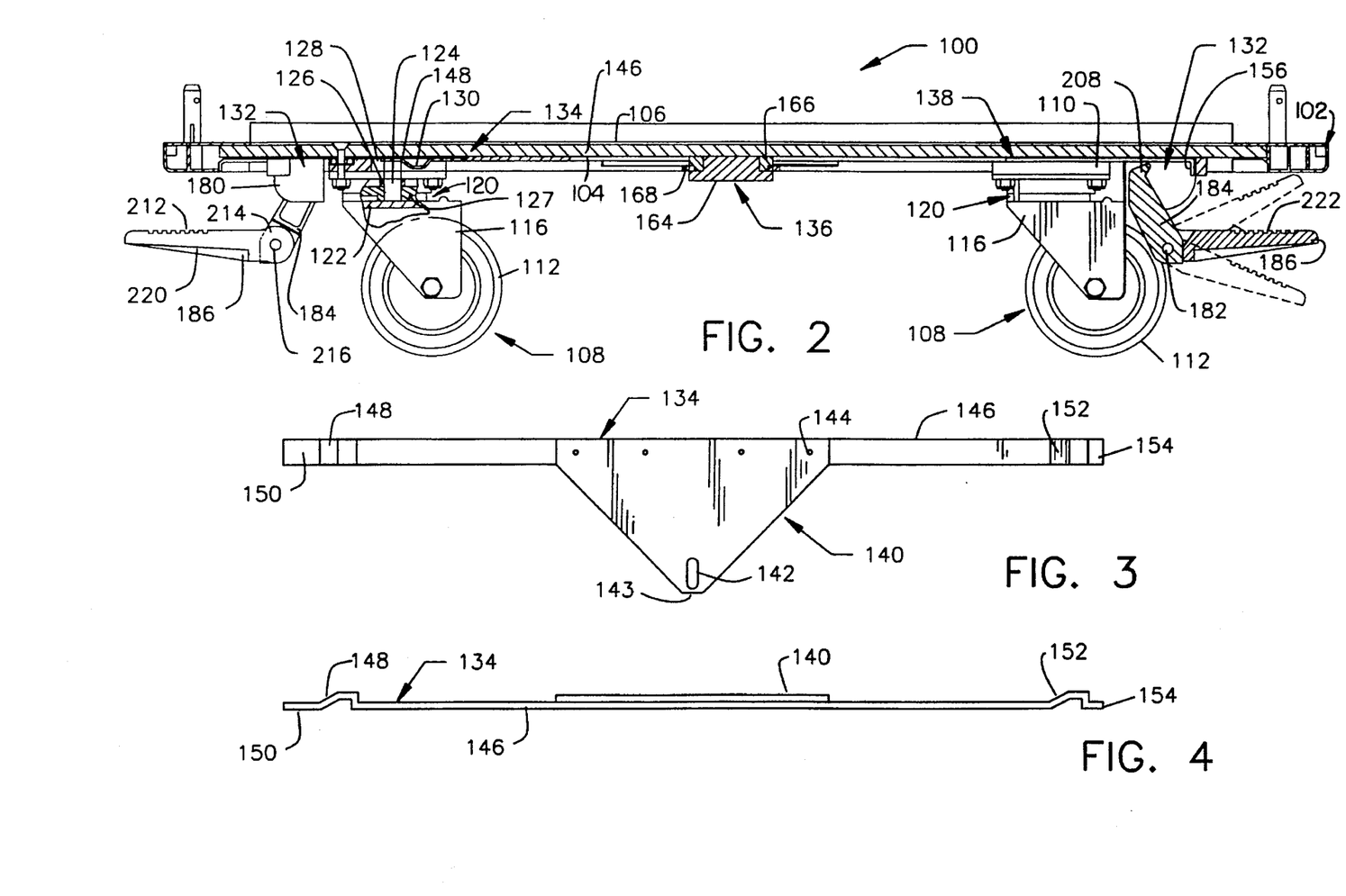
FIG. 2 is a cross-sectional view taken along line 2—2 in FIG. 1.
FIG. 3 is a top plan view of a brake actuator linkage assembly.
FIG. 4 is a front elevational view of the brake actuator linkage assembly.

Referring now to the drawings, wherein like reference numerals represent like elements, there is shown in FIGS. 1 and 2 a utility cart generally designated by reference numeral 100. The utility cart 100 may be adapted for a variety of purposes, for example, as storage carts, push carts, wheeled chairs, work tables, and the like. By way of one example, the utility cart 100 will be described for use as an aircraft galley cart of the type movable between seat aisles for dispensing food and drinks to passengers. The cart 100 includes a baseplate 102 having a bottom surface 104 and a top surface 106. The top surface 106 will support a housing (not shown) which is designed to accommodate the food and drinks to be dispensed therefrom. It should therefore be appreciated that the particular construction of the housing may be varied for the particular application and needs of the user of the cart 100.

The cart 100 includes four wheel assemblies 108, three of which are shown, mounted by means of a spacer 110 to the bottom surface 104 approximate the four corners of the baseplate 102. The wheel assemblies 108 are of conventional construction such as those disclosed in U.S. Pat. No. 4,526,253. More specifically, each wheel assembly 108 includes a pair of wheels 112 journaled about a common axle 114 which is supported by a yoke 116. A spring loaded wheel locking assembly 120 is incorporated as part of the wheel assemblies 108 overlying the wheels 112. The wheel locking assembly 120 generally includes a brake member 122 carried on the end of a thrust pin 124 which is spring biased upwardly by means of surrounding spring 126 and collar 127. The spring 126 is normally arranged to exert a sufficient force to urge the thrust pin 124 and the brake member 122 away from the pairs of wheels 112 within a respective wheel assembly 108. This enables the cart 100 to be freely rollable from one location to another.

Upon application of a sufficient downward force upon the thrust pin 124 so as to overcome the upward force of spring 126, as in the manner to be described hereinafter, the brake member 122 is brought into forced engagement with the pairs of wheels 112 within the wheel assembly 112. The engagement of the brake member 122 with the wheels 112 precludes rollability of the cart 100. The thrust pin 124 has its upper end extending into an opening 128 centrally located within the spacer 110. The opening 128, in turn, is in communication with a longitudinal transversely arranged slot 130 within the spacer 110. Accordingly, by displacement of the brake member 122 by operation of the thrust pin 124, the wheels 112 may be locked and unlocked as desired.

The brake assembly of the present invention is operative of the wheel locking assemblies 120 for displacing the brake member 122 via thrust pin 124 between locking and unlocking positions. The brake assembly is constructed to include a pair of brake actuator pedal assemblies 132, a pair of brake actuator linkage assemblies 134 operatively connected by a center swivel connector assembly 136 and a pair of brake linkages 138. The components of the brake assembly as thus far described are all mounted in operative relationship onto the bottom surface 104 of the baseplate 102.

The brake actuator linkage assembly 134 will now be described in greater detail with reference to FIGS. 3 and 4. Each brake actuator linkage assembly 134 is constructed to include a flat triangular connecting plate 140 having a slotted opening 142 located adjacent an apex 143 of the connecting plate. The connecting plate 140 is secured along its base edge 144 centrally onto an elongated brake actuator linkage 146. The brake actuator linkage 146 is constructed as an elongated flat member having a first ramped portion 148 adjacent one end segment 150 and a second ramped portion 152 adjacent another end segment 154. It is noted that ramped portion 148 slopes in the same direction as ramped portion 152. The ramped portions 148, 152 function as cams to engage the thrust pin 124 within a wheel assembly 108.

The bracket actuator linkage assemblies 134 are mounted overlying the bottom surface 104 of the baseplate 102 with the apexes 143 of the connecting plates 140 opposing one another. The brake actuator linkages 146 are parallel relationship to each other adjacent the sides of the baseplate 102. The ends of the brake actuator linkages 146 are freely received within the slotted openings 142 within corresponding spacers 110. This arrangement positions the ramped portions 148, 152 in operative association with the thrust pins 124 within the spring loaded wheel locking assemblies 120. This arrangement enables the free ends of the brake actuator linkages 146 to be translatable within the spacers 110 as to be described hereinafter.

Figures 5, 6, 7:
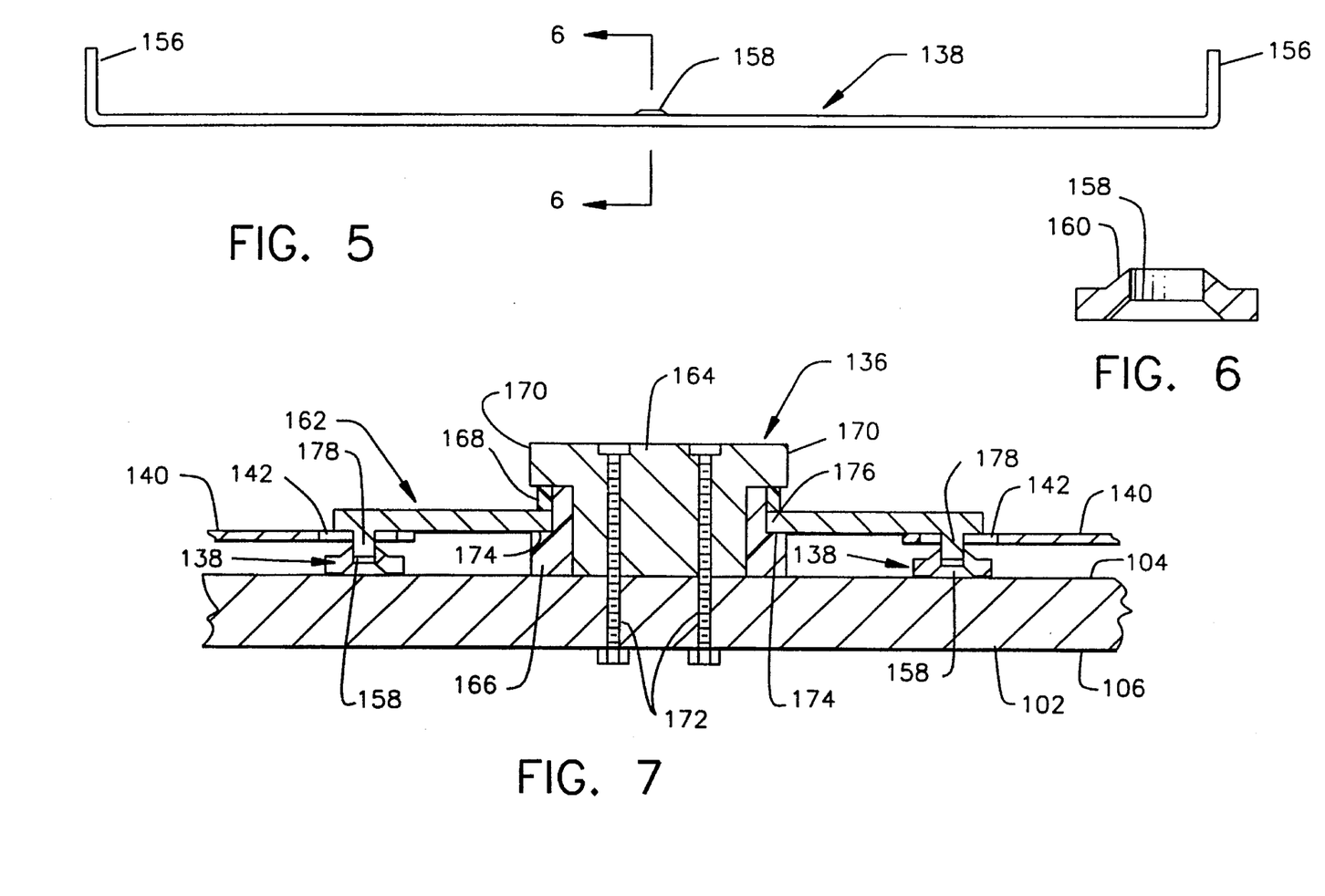
FIG. 5 is a side elevational view of a brake linkage.
FIG. 6 is a cross-sectional view taken along line 6—6 in FIG. 5.
FIG. 7 is a cross-sectional view of a swivel connector assembly in operative arrangement with the brake linkage and brake actuator linkage assembly.

The brake linkages 138 are arranged in spaced apart parallel relationship overlying the bottom surface 104 of the baseplate 102 extending between the bracket actuator pedal assemblies 132. As shown in FIG. 5 and 6, the brake linkages 138 are constructed from an elongated flat member having upturned ends 156. A dimpled opening 158 having a raised portion 160 is located midway along the brake linkage 138. The bracket actuator linkage assemblies 134 and bracket linkages 138 are operatively connected by means of the swivel connector assembly 136.

Referring to FIG. 7, the swivel connector assembly 136 includes a swivel connector 162, a holder 164, a shoulder washer 166 constructed of synthetic material such as nylon or Delrin, and a flat washer 168 also constructed of similar synthetic materials. The holder 164 is constructed as a cylindrical T-shaped body having an outwardly extending circumferential flange 170. The holder 164 is secured to the baseplate 102 between the apexes 143 of the opposing connecting plates 140 by means of a pair of bolts or screws 172. The shoulder washer 166 is constructed as a hollow tubular body having an outwardly extending circumferential shoulder 174. The shoulder washer 166 is positioned about the holder 164 between its flange 170 and bottom surface 104 of the baseplate 102.

The swivel connector 162 is constructed as a diamond-shaped flat plate having a central opening 176 and a pair of spaced apart pegs 178 at opposite ends thereof. The opening 176 is sized such that the portions of the swivel connector 162 circumscribing the opening will rest upon the shoulder 174 of the shoulder washer 166. The swivel connector 162 is maintained in this arrangement by flat washer 168 being positioned between the swivel connector and the flange 170 of the holder 164. As the shoulder washer 166 and flat washer 168 are constructed of synthetic materials, the swivel connector 162 is free to rotate therebetween about the holder 164 with a minimum of friction. The depending pegs 178 are so located so as to extend through slotted openings 142 within the adjacent connecting plates 140 where they are ultimately received within the dimpled openings 158 within the bracket linkages 138.

Based on the foregoing construction, the swivel connector 162 is rotatable about stationary holder 164. As to be described hereinafter, this rotation is effected by the longitudinal movement of the brake linkages 138 which have received in their dimpled openings 158 the pegs 178 of the swivel connector. The rotation of the swivel connector 162 causes, in turn, longitudinal movement of the bracket actuator linkage assemblies 134 by means of pegs 178 which are also received within slotted openings 142 of the connecting plates 140.

Figure 8:
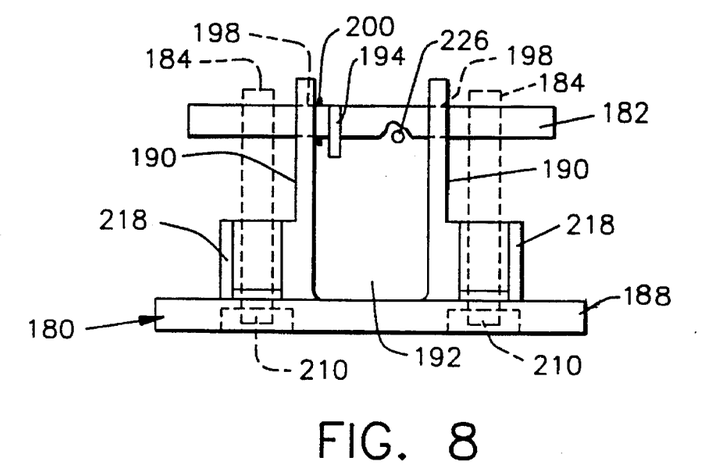
FIG. 8 is a rear elevational view of a pedal mounting bracket.
Figure 9:
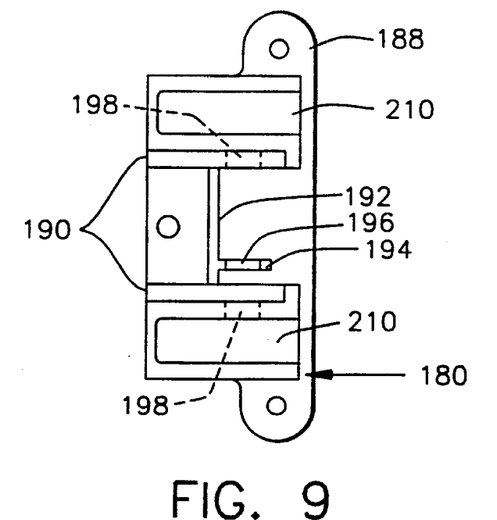
FIG. 9 is a top plan view of the pedal mounting bracket.

As previously described, the swivel connector assembly 136 is operative by means of the brake linkages 138. In turn, the brake linkages 138 are operative by means of the brake actuator pedal assemblies 132. Generally with reference to FIGS. 1 and 2, and more specifically with reference to FIGS. 8–10, the brake actuator pedal assembly 132 includes a pedal mounting bracket 180, an axle 182, a pair of pedal supports 184 and a pair of pedals 186. The pedal mounting bracket 180 includes a base 188 which supports a pair of spaced apart, upstanding support walls 190. The support walls 190 are interconnected by a web member 192 from which there extends a support bracket 194 having an opening 196. Opening 196 is arranged in alignment with a pair of openings 198 within the support walls 190. Axle 182 is positioned extending through the openings 198 within the support walls 190, and having a portion thereof received within opening 196 of the support bracket 194. A cotter pin 200 is positioned extending through an opening within the axle 182 between the support wall 190 and support bracket 194. The cotter pin 200 prevents the axle 182 from sliding laterally beyond a nominal amount.

Figure 10:
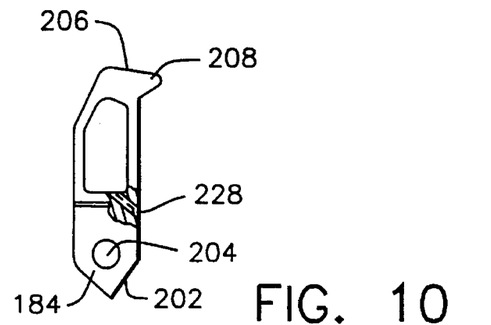
FIG. 10 is a front elevational view of a pedal support, in partial cross-section.

A pedal support 184 is rotationally mounted on either end of the axle 182 outwardly of the support walls 190. As shown in FIG. 10, the pedal support 184 is constructed as a generally flat member having one end 202 through which there extends an opening 204 for receiving the axle 182. The other end 206 of the pedal support 184 includes a projection 208 which is operative for engaging the upturned ends 156 of the brake linkage 138 as to be described hereinafter. Briefly in this regard, the end 206 and projection 208 of the pedal support 184 extends through an opening 210 within the base 188 of the pedal mounting bracket 180 overlying the bottom surface 104 of the baseplate 102.

The pedal support 184 is mounted on the axle 182 in operative association with a pedal 186. As shown in FIGS. 1 and 2, the pedal 186 includes a pedal base 212 from which there extends a pair of spaced apart legs 214 provided with aligned openings 216. A pedal support 184 and pedal 186 are assembled on either end of the axle 182 by positioning end 202 of the pedal support between legs 214 of the pedal with openings 204 and 216 in alignment with each other. The pedal support 184 and pedal 186 combination are prevented from sliding off the end of axle 182 by means of wall 218 which extends upwardly from base 180 adjacent the lower portion of the pedal support.

Based on the foregoing arrangement, depressing the pedal 186 for rotation about axle 182, will cause a portion of the pedal between legs 214 to engage end 202 of the pedal support 184, thereby causing the pedal support also to rotate about the axle. This action is operative for locking and unlocking the wheel assemblies 108 as to be described. At each brake actuator pedal assembly 132, one of the pedals is operative for locking the wheel assemblies 108, while the other pedal is operative for unlocking the wheel assemblies. Accordingly, all of the wheel assemblies 108 can be locked and unlocked from either end of the cart 100.

By way of example, with reference to FIGS. 1 and 2, the pedals 186 will be designated as locking pedals 220 and unlocking pedals 222. Upon depression of either locking pedal 220 using the tip of one's shoe, the locking pedal will cause rotation of the pedal support 184 in a counterclockwise direction as shown in FIG. 2. As the pedal support 184 rotates, its projection 208 will engage the upturned end 156 of the corresponding brake linkage 138 which is received within opening 210 of the pedal mounting bracket 180. The engagement of the pedal support 184 with the upturned end 156 of the brake linkage 138 is better illustrated in the right hand portion of FIG. 2. As the brake linkage 138 is slid longitudinally, the swivel connector assembly 136 will rotate as a result of its pegs 178 being received within the dimpled opening 158 within the brake linkages. In turn, the rotation of the swivel connector assembly 136 will cause longitudinal sliding movement of the brake actuator linkage assemblies 134, also as a result of the pegs 178 being received within the slotted openings 142 of the connecting plates 140. Accordingly, irrespective of which locking pedal 220 is depressed, both of the brake actuator linkage assemblies 134 will be activated.

As the brake actuator linkage 146 is slid longitudinally to the left in FIG. 2, ramped portion 148 at one end thereof will cause the downward deflection of thrust pin 124, bringing brake member 122 into locking engagement with the pair of wheels 112 within the wheel assembly 108. In this regard, the ends of the brake actuator linkage 146 are slidingly received within the slot 130 within the spacers 110 so as to engage the thrust pins 124. Similarly, the other ramped portion 152 on the other end of the brake actuator linkage 146 will engage the thrust pin 124 of another wheel assembly 108 thereby locking the pair of wheels 112 therein. In a like manner, as one brake actuator linkage assembly 134 is slid longitudinally to the left, the other brake actuator linkage assembly is slid to the right, thereby locking the other two wheel assemblies 108 due to the ramped portions 148, 152 being engaged with its corresponding thrust pins 124. When in the locked position, the locking pedals 220 are free to rotate upwardly about axle 182 without causing corresponding rotation of the pedal support 184. This prevents the unlocking of the wheel assemblies 108 in the event the locking pedals 220 are engaged underneath by one's shoe or other object on the floor such as within the aisle of an aircraft. The utility cart is now rendered immovable by locking of the four wheel assemblies 108.

The wheel assemblies 108 are unlocked by depressing the unlocking pedals 222. As either unlocking pedal 222 is depressed downwardly, its rotation about axle 182 causes its corresponding pedal support 184 to rotate whereby its projection 208 engages the upturned end 156 of the brake linkage 138. As the brake linkage 138 is slid longitudinally by the pedal support 184, its coupling to the swivel connector assembly 136 is operative to effect longitudinal movement of the brake actuator linkage 146 of each brake actuator linkage assembly 134 in the manner as previously described during the locking operation. As the brake actuator linkage 146 is longitudinally slid to the right, as illustrated in FIG. 2, the ramped portion 148 disengages from the thrust pin 124 allowing the brake member 122 to disengage from the pairs of wheels 112 by operation of compression spring 126. The ramped portion 152 at the other end of the brake actuator linkage 146 similarly disengages from the thrust pin 124. As previously noted, as one brake actuator linkage assembly 134 is actuated, the other brake actuator linkage assembly is also actuated by its coupling through the swivel connector assembly 136. In this manner, all four wheel assemblies 108 may be unlocked by depressing either of the unlocking pedals 222.

Unlike the locking pedal 220, the unlocking pedal 222 will return to its original orientation after being depressed. As noted, both the locking and unlocking pedals 220, 222 are free to rotate about axle 182 within the pedal mounting bracket 180. To effect return of the pedal support 184 and unlocking pedal 222 to their initial orientation, a coiled spring 224 is positioned about the axle 182. The spring 224 has one end received within an opening 226 within the web member 192 of the pedal mounting bracket 180. The other end of the spring 224 is received within an opening 228 extending through a portion of the pedal support 184, see FIG. 10. The coiled spring 224 effectively biases the unlocking pedals 222 into their neutral horizontal orientation for maintaining same after being depressed when unlocking the wheel assemblies 108.

From the foregoing description of the brake assembly in accordance with the present invention, the utility cart 100 such as an airline galley cart, can have its wheel assemblies 108 locked and unlocked by a respective locking and unlocking pedal 220, 222 located at either end of the baseplate 102.

In accordance with another embodiment of the present invention, a brake assembly for a utility cart 100 can be constructed to enable the locking and unlocking of the wheel assemblies 108 from only one end of the cart. Such an arrangement is particularly suitable to smaller sized utility carts 100 than those previously described with respect to FIGS. 1 and 2. In this regard, such a utility cart 100 having a brake actuator pedal assembly 132 positioned at only one end of the baseplate 102 is disclosed in FIGS. 11 and 12.

Figure 11:
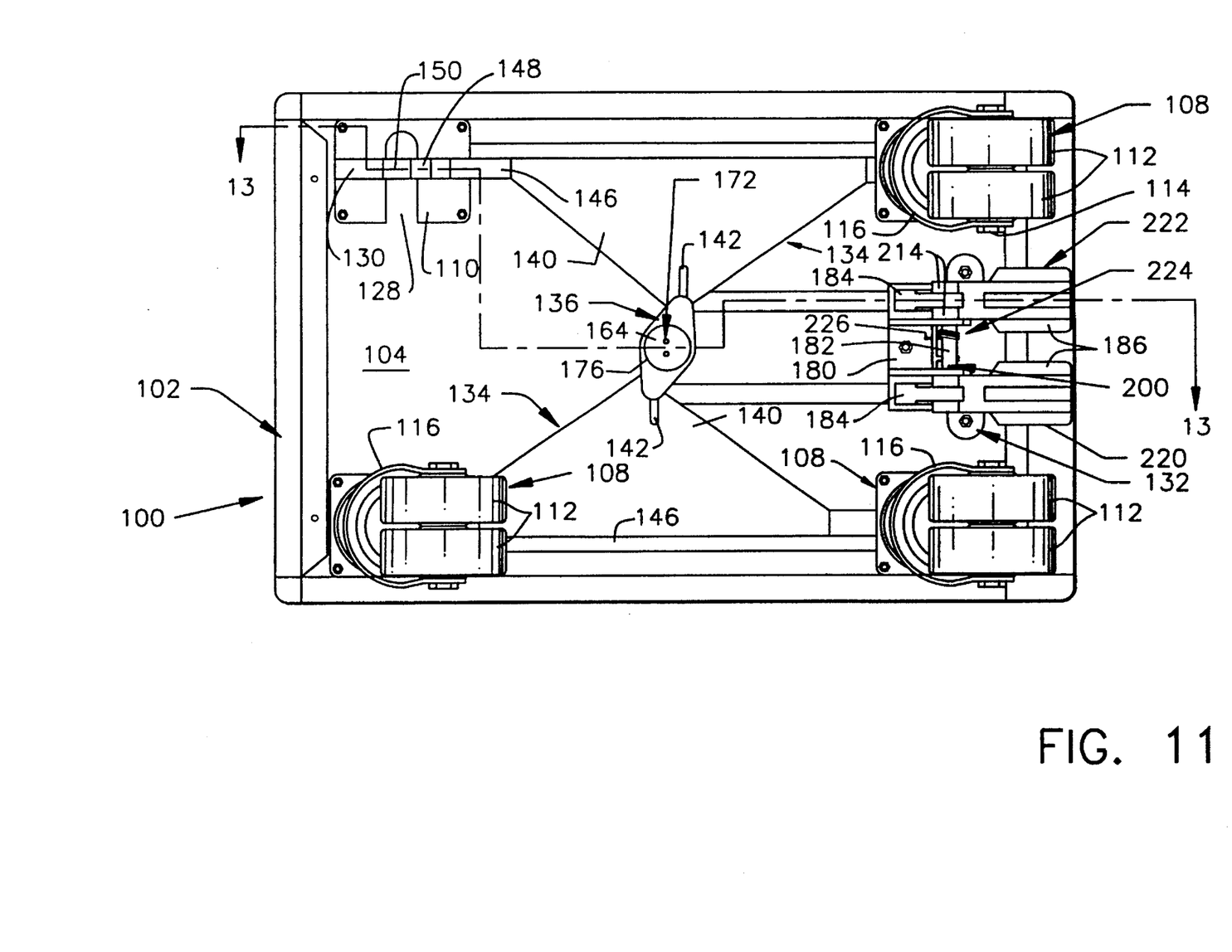
FIG. 11 is a top plan view of a brake assembly for a rollable utility cart, such as an aircraft galley cart, constructed in accordance with another embodiment of the present invention.
Figures 12, 13:
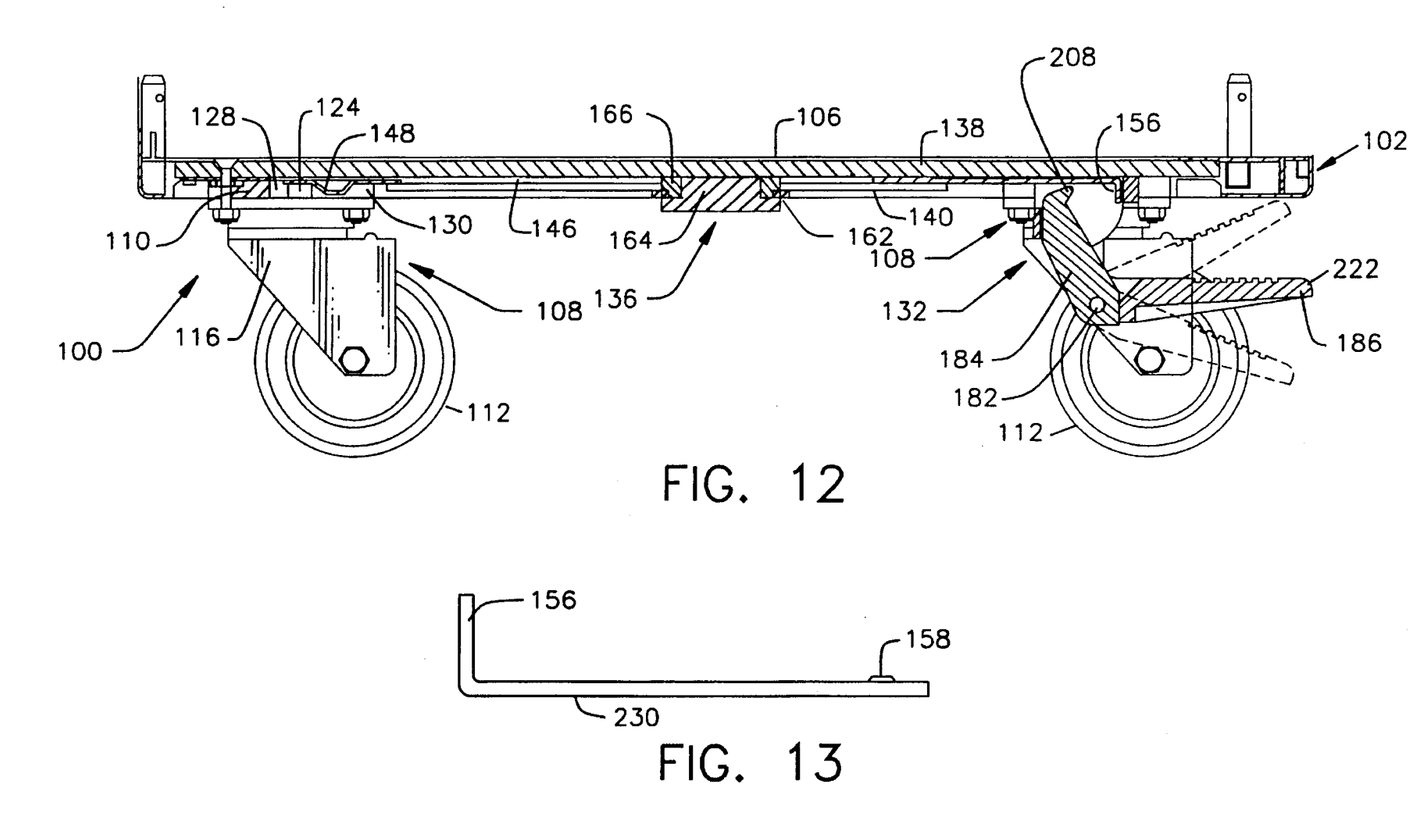
FIG. 12 is a cross-sectional view taken along line 11—11 in FIG. 11.
FIG. 13 is a side elevational view of a brake linkage constructed in accordance with another embodiment of the present invention.

The brake assembly as shown is constructed substantially similar to the brake assembly as disclosed and described with respect to FIGS. 1–10. Essentially, the difference between the two brake assemblies resides in the arrangement of the brake actuator pedal assembly 132 at either both ends of the cart 100 as shown in FIG. 1 or at only one end of the cart as shown in FIG. 11. To accommodate the presence of only a single brake actuator pedal assembly 132, a shortened brake linkage 230, as shown in FIG. 13, is provided. The brake linkage 230 is provided with a similar upturned end 156 and a dimpled opening 158 as the brake linkage 138.

The brake linkage 230 differs from brake linkage 138 in that it terminates along its longitudinal length immediately adjacent the dimpled opening 158. The dimpled opening 158 of the brake linkage 230 receives the pegs 178 of the swivel connector 162 in the manner as previously described. The locking and unlocking of the wheel assemblies 108 by means of a single locking pedal 220 and single unlocking pedal 222 is as previously described with respect to the brake assembly having a brake actuator pedal assembly 132 at either end of the baseplate 102.

A utility cart, such as an aircraft galley cart has been thus far described to include a novel brake assembly which is operative for locking and unlocking a plurality of wheel assemblies at either end of the cart. The brake assembly is constructed from a limited number of components which are light in weight, inexpensive to manufacture, and easily assembled into an operative brake assembly. The brake assembly is easily repairable in the event of worn or broken components. However, due to the simple construction of the individual components, it is expected that the components will have a long lifetime of use before the need for repair or the like.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A brake assembly for a rollable article, said article including a base and a plurality of wheels attached to said base having at least one wheel locking assembly arrangeable in a first condition for locking at least one of said wheels to prevent rolling movement of said article and a second condition for unlocking at least one of said wheels to permit rolling movement of said article, said brake assembly comprising at least one brake actuator pedal assembly attached to one end of said base, a linearly moveable brake actuator linkage having a ramped portion at one end thereof in operative association with said wheel locking assembly, a brake linkage moveable upon actuation of said brake actuator pedal assembly, and a rotatable swivel connector assembly connecting said brake linkage to said brake actuator linkage such that rotation of said swivel connector by movement of said brake linkage by operation of said brake actuator pedal assembly causing linear movement of said brake actuator linkage whereby said ramped portion is brought into engagement with said wheel locking assembly to alter the condition of said wheel locking assembly from said second condition to said first condition.

2. The brake assembly of claim 1, wherein said brake actuator pedal assembly comprises a locking pedal and an unlocking pedal journaled to a bracket, and a pair of pedal supports journaled to said bracket and rotatable upon depression of said locking pedal and said unlocking pedal.

3. The brake assembly of claim 2, wherein said brake linkage includes an upturned end engageable upon rotation of said pedal support for effecting sliding movement of said brake linkage.

4. The brake assembly of claim 3, wherein said upturned end is unconnected to said brake actuator pedal assembly.

5. The brake assembly of claim 2, wherein said brake actuator linkage further includes a connector plate joining said brake actuator linkage to said swivel connector assembly.

6. The brake assembly of claim 5, wherein said swivel connector assembly comprises a swivel connector rotating mounted about a holder attached to said base, said swivel connector including at least one peg engaging said brake linkage and said connector plate.

7. The brake assembly of claim 6, wherein said peg is slidingly received within a slotted opening within said connector plate.

8. The brake assembly of claim 1, wherein said brake actuator pedal assembly includes at least one brake unlocking pedal at one end of said base in operative association with said brake linkage for rotation of said swivel connector assembly.

9. The brake assembly of claim 8, wherein rotation of said swivel connector assembly by said brake unlocking pedal causes linear movement of said brake actuator linkage whereby said ramped portion is brought out of engagement with said wheel locking assembly to alter the condition of said wheel locking assembly from said first condition to said second condition.

10. A brake assembly for a rollable article, said article including a base, a plurality of wheel assemblies attached to said base, each of said wheel assemblies including at least one wheel, and at least one wheel locking assembly within one of said wheel assemblies arrangeable in a first condition for locking at least one of said wheels to prevent rolling movement of said article and a second condition for unlocking at least one of said wheels to permit rolling movement of said article, said brake assembly comprising at least one brake actuator pedal assembly attached to one end of said base, a brake actuator linkage having a ramped portion positionable within at least one of said wheel assemblies in operative association with said at least one wheel locking assembly therein, a brake linkage in operative association with said brake actuator pedal assembly, and a swivel connector assembly operatively connecting said brake linkage to said brake actuator linkage assembly, whereby operation of said brake actuator pedal assembly causes rotation of said swivel connector assembly by means of said brake linkage such that said ramped portion is operative for engaging said at least one wheel locking assembly to alter its condition from said second condition to said first condition.

11. The brake assembly of claim 10, wherein said brake actuator linkage assembly comprises an elongated brake actuator linkage having said ramped portion at one end thereof, and a connector plate attached thereto.

12. The brake assembly of claim 11, wherein said connector plate includes a slotted opening receiving a portion of said swivel connector assembly.

13. The brake assembly of claim 11, wherein said swivel connector assembly comprises a swivel connector rotatably mounted about a holder attached to said base, said swivel connector including at least one peg engaging said brake linkage and said connector plate.

14. The brake assembly of claim 10, wherein said rollable article comprises an aircraft galley cart.

15. The brake assembly of claim 10, wherein said article includes a wheel locking assembly in operative association with each of said wheels attached to said base.

16. The brake assembly of claim 15, further including a brake actuator pedal assembly attached at opposite ends of said base, each brake actuator pedal assembly comprising a locking pedal and an unlocking pedal journaled to a bracket, and a pair of pedal supports journaled to said bracket and rotatable upon depression of said locking pedal and said unlocking pedal.

17. The brake assembly of claim 16, further including a pair of brake linkages each having upturned ends, said ends being in operative association with one of said pedal supports for engagement therebetween upon depression of one of said pedals.

18. The brake assembly of claim 17, further including a pair of brake actuator linkage assemblies, each of said brake actuator linkage assemblies comprising an elongated brake actuator linkage having said ramped portion at each end thereof, and a connector plate attached thereto.

19. The brake assembly of claim 18, wherein said swivel connector assembly comprises a swivel connector rotatably mounted about a holder attached to said base, said swivel connector including a pair of pegs engaging each of said brake linkages and each of said connector plates, whereby depression of one of said locking pedals causes said ramped portions to alter the condition of each of said wheels from said second condition to said first condition, and depression of one of said unlocking pedals causes said ramped portions to alter the condition of each of said wheels form said first condition to said second condition.

20. The brake assembly of claim 10, wherein said brake actuator pedal assembly comprises a locking pedal and an unlocking pedal each journaled to a bracket, and a pair of pedal supports journaled to said bracket and rotatable upon depression of said locking pedal and said unlocking pedal.

21. The brake assembly of claim 20, wherein said brake linkage includes an upturned end engageable upon rotation of said pedal support for effecting sliding movement of said brake linkage.

22. The brake assembly of claim 10, wherein said brake actuator pedal assembly includes at least one brake unlocking pedal at one end of said base in operative association with said brake linkage for rotation of said swivel connector assembly.

23. The brake assembly of claim 22, wherein rotation of said swivel connector assembly by said brake unlocking pedal causes linear movement of said brake actuator linkage whereby said ramped portion is brought out of engagement with said wheel locking assembly to alter the condition of said wheel locking assembly from said first condition to said second condition.

24. A rollable cart comprising a base having a front end and a rear end and a top surface and a bottom surface; a plurality of wheels mounted on said bottom surface of said base at said front and rear ends; a plurality of wheel locking assemblies arranged in operative association with said plurality of wheels for placing said plurality of wheels into locked and unlocked conditions, said wheel locking assemblies each including wheel restraining means arranged between said bottom surface of said base and said plurality of wheels for directly engaging and disengaging said plurality of wheels upon actuation thereof; and a brake assembly arranged on said bottom surface of said base for operation of each of said wheel locking assemblies, said brake assembly comprises a plurality of elongated brake actuator linkages extending longitudinally between said plurality of wheels between said front and rear ends of said base, each of said elongated brake actuator linkages having a first ramped portion and a second ramped portion arranged for engagement with respective ones of said wheel locking assemblies, and brake actuator means for actuating said plurality of elongated brake actuator linkages into engagement and disengagement with said plurality of wheel locking assemblies whereby said first and second ramped portions place said plurality of wheel locking assemblies in a locking condition wherein said wheel restraining means are urged into direct engagement with said plurality of wheels and an unlocking condition wherein said wheel restraining means return to their disengaged position with respect to said plurality of wheels.

25. The rollable cart of claim 24, wherein said plurality of wheel locking assemblies each comprise a pin having said wheel restraining means attached thereto opposing said wheels and a spring normally arranged to exert a force sufficient to urge said pin and said wheel restraining means away from a corresponding one of said plurality of wheels, said force of said spring selected to be overcome by a counter force exerted on said pin by said first or second ramped portions of said plurality of elongated brake actuator linkages upon actuation of said brake actuator pedal means, whereby said wheel restraining means is urged into direct engagement with a corresponding one of said plurality of wheels.

26. The rollable cart of claim 25, wherein said wheel restraining means comprises a brake member.

27. The rollable cart of claim 24, wherein said brake actuator means comprises at least one locking pedal and at least one unlocking pedal operatively connected to said plurality of elongated brake actuator linkages whereby actuation of said at least one locking pedal causes said plurality of elongated brake actuator linkages to slide along a longitudinal direction so that said first and second ramped portions urge said wheel restraining means into direct engagement with corresponding ones of said plurality of wheels to place said plurality of wheels into said locked condition, and whereby actuation of said at least one unlocking pedal causes said plurality of elongated brake actuator linkages to slide along a longitudinal direction so that said first and second ramped portions are moved away from said wheel restraining means thus permitting said wheel restraining means to move to said disengaged position with respect to said plurality of wheels.

28. The rollable cart of claim 27, wherein said brake actuator means further comprises a plurality of brake linkages extending longitudinally between said plurality of elongated brake actuator linkages, each of said plurality of brake linkages including a first end operatively connected to said at least locking pedal and a second end operatively connected to said at least one unlocking pedal.

29. The rollable cart of claim 28, wherein said brake actuator means further comprises connector means for operatively connecting said plurality of brake linkages to said plurality of elongated brake actuator linkages, whereby actuation of said at least one locking or unlocking pedal imparts longitudinal sliding movement to said plurality of brake linkages and said plurality of elongated brake actuator linkages so that said plurality of wheels can be placed into said locked and unlocked conditions by means of said first and second ramped portions.

30. The rollable cart of claim 28, wherein said brake actuator means further comprises a plurality of connecting plates attached to said plurality of elongated brake actuator linkages.

31. The rollable cart of claim 30, wherein said connector means comprises a swivel connector rotatably mounted about a holder attached to said bottom surface of said base, said swivel connector including a pair of pegs engaging said brake linkages and said connecting plates.

32. The rollable cart of claim 27, wherein said brake actuator means further includes a plurality of pedal supports rotatable by said at least one locking and unlocking pedal.

33. The rollable cart of claim 32, wherein said plurality of elongated brake linkages each have an upturned end for operative engagement with said pedal supports.

34. The rollable cart of claim 24, wherein said brake actuator means comprises a locking pedal and an unlocking pedal journaled to a bracket, a pair of pedal supports journaled to said bracket and rotatable upon depression of said locking pedal and said unlocking pedal, a brake linkage longitudinally slidable upon depression of said locking pedal and said unlocking pedal, and a rotatable swivel connector assembly operatively coupling said brake linkage to said elongated brake actuator linkage, whereby rotation of said swivel connector causes sliding movement of said first and second ramped portions to alter the condition of said wheel locking assemblies.

35. A brake assembly for a rollable article, said article including a base, a plurality of wheels attached to said base, and a plurality of wheel locking assemblies respectively in operative association with said wheels, said wheel locking assemblies arrangeable in a first condition for locking said wheels to prevent rolling movement of said article and a second condition for unlocking said wheels to permit rolling movement of said article, said brake assembly comprising a pair of brake actuator pedal assemblies respectively attached at opposite ends of said base, each brake actuator pedal assembly including a locking pedal and an unlocking pedal journaled to a bracket, and a pair of pedal supports journaled to said bracket and rotatable upon depression of said locking pedal and said unlocking pedal; a pair of brake actuator linkage assemblies, each of said brake actuator linkage assemblies including an elongated brake actuator linkage having a ramped portion at each end thereof respectively arranged in operative association with said wheel locking assemblies, and a connector plate attached thereto; a pair of brake linkages in respective operative association with said brake actuator pedal assemblies, said brake linkages each having upturned ends in respective operative association with said pedal supports for engagement therebetween upon depression of one of said pedals; and a swivel connector assembly operatively connecting said brake linkages to said brake actuator linkage assemblies, whereby operation of either one of said brake actuator pedal assemblies causes rotation of said swivel connector assembly by means of one of said brake linkages such that the ramped portions of said brake actuator linkage assemblies are operative for arranging said wheel locking assemblies in one of said first and second conditions.

* * * * *